United States Patent
Szailer et al.

(10) Patent No.: US 9,708,953 B1
(45) Date of Patent: Jul. 18, 2017

(54) APPARATUSES AND METHODS FOR ONBOARD DIAGNOSTIC MONITORING AND DETECTION

(71) Applicant: FEV North America, Inc., Aachen (DE)

(72) Inventors: Tamas Szailer, Clarkston, MI (US); Harsha Nanjundaswamy, Rochester Hills, MI (US); Joel Deussen, Hartland, MI (US); Dean Tomazic, Orion Township, MI (US)

(73) Assignee: FEV North America, Inc., Auburn Hills, MI (US)

( * ) Notice: Subject to any disclaimer, the term of this patent is extended or adjusted under 35 U.S.C. 154(b) by 0 days.

(21) Appl. No.: 15/057,226

(22) Filed: Mar. 1, 2016

(51) Int. Cl.
*F01N 11/00* (2006.01)
*F01N 3/20* (2006.01)
*F02M 26/00* (2016.01)

(52) U.S. Cl.
CPC ............ *F01N 3/2066* (2013.01); *F01N 11/00* (2013.01); *F02M 26/00* (2016.02); *F01N 2550/02* (2013.01); *F01N 2900/0416* (2013.01); *F02M 2026/001* (2016.02)

(58) Field of Classification Search
CPC ...... F01N 3/035; F01N 11/00; F01N 2250/02; F01N 2550/00; F01N 2550/02; F01N 2550/20; F01N 2560/026; F01N 2900/1621
See application file for complete search history.

(56) References Cited

U.S. PATENT DOCUMENTS

| 7,624,628 | B2 | 12/2009 | Bartley |
| 2010/0293925 | A1 | 11/2010 | Lahr et al. |
| 2011/0000189 | A1 | 1/2011 | Mussmann et al. |
| 2015/0033706 | A1* | 2/2015 | Pfaffinger ............... F01N 3/035 60/274 |

* cited by examiner

*Primary Examiner* — Jonathan Matthias
(74) *Attorney, Agent, or Firm* — Dinsmore & Shohl LLP

(57) ABSTRACT

Methods and apparatuses for monitoring an oxidation catalyst in a vehicle exhaust system include a diesel internal combustion engine with an exhaust system that has an EGR, a DOC/DPF downstream from the EGR, an SCR catalyst downstream of the DOC/DPF, a first NOx sensor located upstream of the DOC/DPF, and a second NOx sensor located downstream of the SCR catalyst. A monitoring cycle of the exhaust system during operation of the diesel ICE includes executing a DPF regeneration event, shutting off the EGR, terminating urea dosing to the SCR catalyst, emptying $NH_3$ storage in the SCR catalyst, and intrusively maintaining the temperature of the DOC/DPF within a predetermined temperature range. Readings from the first NOx sensor and the second NOx sensor allow for a ratio between first NOx sensor readings and second NOx sensor readings, the ratio providing an indication as to whether or not the DOC/DPF is failing or operating properly.

14 Claims, 4 Drawing Sheets

APPARATUSES AND METHODS FOR ONBOARD DIAGNOSTIC MONITORING AND DETECTION

FIELD OF THE INVENTION

The present specification generally relates to onboard diagnostic systems and, more specifically, to onboard diagnostic systems and methods for monitoring and detecting failure of oxidation catalysts using nitrogen dioxide sensitivity of NOx sensors.

BACKGROUND OF THE INVENTION

New regulations for exhaust gas emissions for motor vehicles continue to provide challenges for emission and onboard diagnostic (OBD) compliance. Such regulations require that levels of hydrocarbons (HC), carbon monoxide (CO), and nitrogen monoxide (NO) in exhaust gas exiting an exhaust system of a motor vehicle be below predefined levels set by one or more government agencies and regulations, e.g. the Clean Air Act.

The use of automotive emissions catalysts to help control levels of HC, CO, and NO is known. One type of catalyst, known as an oxidation catalyst, typically contains a metal such as platinum, palladium, or rhodium which assists in oxidizing HC to $CO_2$ and water ($H_2O$), CO to $CO_2$, and NO to $NO_2$.

Oxidation catalysts are known to decrease in efficiency with prolonged use and thus monitoring and detecting of degradation of the catalysts is desired in order to ensure levels of HC, CO and NO are maintained below the pre-define levels. However, conventional monitoring and detection techniques require additional sensors, equipment, etc., to determine if an oxidation catalyst is performing properly or decreasing in efficiency. Accordingly, a need exists for alternative OBD monitoring systems and methods that can determine if an oxidation catalyst in a vehicle exhaust gas system is performing properly without the use of additional sensors, equipment, etc. that are part of a conventional vehicle exhaust and OBD system.

SUMMARY OF THE INVENTION

In one aspect, a method for monitoring an oxidation catalyst in a vehicle exhaust system includes operating a diesel internal combustion engine (ICE) such that exhaust gas from the diesel ICE flows through an exhaust system of the vehicle. The exhaust system includes exhaust gas recirculation (EGR), a diesel oxidation catalyst/diesel particulate filter (DOC/DPF) downstream from the EGR, a selective catalytic reduction (SCR) catalyst downstream of the DOC/DPF, a reducing agent dosing system for injecting a reducing agent into the exhaust system upstream of the SCR catalyst and thereby providing the reducing agent to the SCR catalyst, a first NOx sensor located upstream of the DOC/DPF, and a second NOx sensor located downstream of the SCR catalyst. During operation of the diesel ICE a monitoring cycle is executed. The monitoring cycle includes executing a DPF regeneration event, shutting off the EGR, terminating dosing of the reducing agent to the SCR catalyst and emptying storage of the reducing agent in the SCR catalyst. The monitoring cycle also includes intrusively maintaining the temperature of the DOC/DPF within a predetermined temperature range. During the monitoring cycle, NOx readings from the first NOx sensor and NOx readings from the second NOx sensor are obtained. A ratio between the first NOx sensor readings and the second NOx sensor readings (NOx1/NOx2) is determined and in the event that the NOx1/NOx2 ratio is less than a predetermined reference value, an alert signal is provided. The predetermined temperature range for which the DOC/DPF is intrusively maintained within can be between 270-350° C.

In other aspects, a system for measuring the efficiency of an oxidation catalyst in an exhaust system includes a diesel ICE with an exhaust system. The exhaust system has an EGR, a DOC/DPF located downstream from the EGR, an SCR catalyst located downstream from the DOC/DPF, a reducing agent dosing system for injecting a reducing agent into the exhaust system upstream of the SCR catalyst and thereby providing the reducing agent to the SCR catalyst, a first NOx sensor upstream from the DOC/DPF, and a second NOx sensor downstream the SCR catalyst. The system also includes an ECU with one or more processors and a non-transitory computer-readable medium storing computer-executable instructions. When executed, the one or more processors and the computer-readable instructions cause the system to execute a DPF regeneration event, shut off the EGR, turn off reducing agent dosing to the SCR catalyst, empty storage of the reducing agent in the SCR catalyst, and establish and control the temperature of the DOC/DPF within a predetermined temperature range. The computer-executable instructions when executed by the one or more processors also cause the system to obtain NOx readings (data) from the first NOx sensor and NOx readings from the second NOx sensor. A ratio between the first NOx sensor readings and the second NOx sensor readings (NOx1/NOx2) is determined and if the NOx1/NOx2 ratio is less than a predetermined reference value, an alert signal is provided by the ECU.

These and additional features provided by the aspects described herein will be more fully understood in view of the following detailed description, in conjunction with the drawings.

BRIEF DESCRIPTION OF THE DRAWINGS

The aspects set forth in the drawings are illustrative and exemplary in nature and not intended to limit the subject matter defined by the claims. The following detailed description of the illustrative embodiments can be understood when read in conjunction with the following drawings, where like structure is indicated with like reference numerals, and in which:

DETAILED DESCRIPTION OF THE PREFERRED EMBODIMENTS

Figure 1:
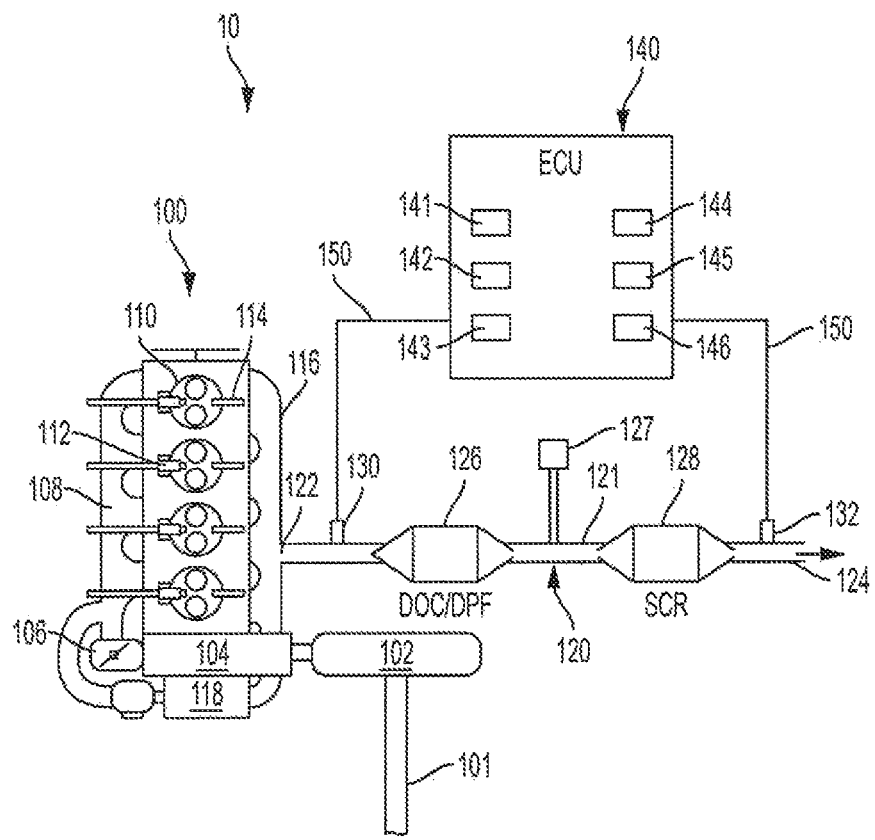
FIG. 1 schematically depicts a diesel internal combustion engine with an exhaust gas system according to one or more aspects described and illustrated herein.

FIG. 1 generally depicts a diesel ICE with an exhaust and OBD system that provides monitoring and detection of a DOC/DPF using $NO_2$ sensitivity of NOx sensors. The diesel ICE can have an EGR, a DOC/DPF located downstream from the EGR, and an SCR catalyst located downstream from the DOC/DPF. A reducing agent dosing system that injects a reducing agent upstream of the SCR catalyst can also be included. A first NOx sensor is located upstream of the DOC/DPF and a second NOx sensor is located downstream from the SCR catalyst. An electronic control unit with one or more processors and a non-transitory computer-readable medium with stored computer-executable instructions is included and the ECU is communicatively coupled with one or more sensors, fuel injectors, switches, etc., of the diesel ICE, the first NOx sensor, and the second NOx sensor. The computer-executable instructions when executed by the one or more processors cause the diesel ICE and the exhaust system to execute a DPF regeneration event, shut off the EGR, turn off reducing agent dosing to the SCR catalyst, and intrusively control the temperature of the DOC/DPF within a predetermined temperature range. The computer-executable instructions when executed by the one or more processors also cause NOx readings from the first NOx sensor to be taken and NOx readings from the second NOx sensor to be taken. The computer-executable instructions when executed by the one or more processors determine a ratio between the first NOx sensor readings and the second NOx sensor readings (NOx1/NOx2). In the event that the NOx1/NOx2 ratio is smaller or less than a predefined reference value, the ECU provides a signal that the efficiency of the DOC with respect to oxidizing NO to $NO_2$ is below or predetermined reference value.

Still referring to FIG. 1, a system 10 for OBD monitoring and detecting of an oxidation catalysts may include a diesel ICE 100 with an air intake 101 fluidly coupled to a turbocharger 102. The turbocharger 102 provides pressurized air to the diesel ICE 100 through an intercooler 104 and an intake throttle valve 106. The intake throttle valve 106 can adjust the amount of air that enters the diesel ICE 100. The pressurized air can pass through an intake manifold 108 before entering one or more individual cylinders 110. Fuel can be introduced to the individual cylinders 110 through one or more fuel injectors 112 positioned within each cylinder 110. A glow plug 114 can be positioned within each of the cylinders 110 or respective cylinder heads.

An exhaust system 120 is included. The exhaust system 120 can include an exhaust manifold 116 and an exhaust pipe 121 with an inlet 122 and an outlet 124. An EGR 118 that allows at least a portion of exhaust gas to be recirculated through the diesel ICE 100 can be included. The exhaust system 120 includes a DOC/DPF 126 located downstream from the EGR 118 and an SCR catalyst 128 located downstream from the DOC/DPF 126. A reducing agent dosing system 127 for injection of a reducing agent into the exhaust system 120 upstream of the SCR catalyst 128 can be included. The reducing agent can be urea, anhydrous ammonia, aqueous ammonia or a combination thereof. A first NOx sensor 130 can be located upstream of the DOC/DPF 126 and a second NOx sensor 132 can be located downstream from the SCR catalyst 128. It should be appreciated that the first NOx sensor 130 and the second NOx sensor 132 provide electrical signals related to NOx content in the exhaust gas flowing past the sensors 130, 132. Any sensor that is responsive to NOx, including NO and $NO_2$, maybe used, illustratively including the Smart NOx Sensor from NGK Ceramics, Inc., Mooresville, N.C. It should also be appreciated that the first NOx sensor 130 and the second NOx sensor 132 respond differently to concentrations of NO and $NO_2$, to be discussed in more detail below.

Still referring to FIG. 1, the system 10 includes an ECU 140 that has on one or more processors 141, one or more memory modules 142, and other components 143-146. Each of the one or more processors 141 may be a controller, an integrated circuit, a microchip, or any other computing device. The one or more memory modules 142 may be non-transitory computer-readable medium and be configured as RAM, ROM, flash memories, hard drives, and/or any device capable of storing computer-executable instructions such that the computer-executable instructions can be accessed by the one or more processors 141. The computer-executable instructions can comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer-executable instructions and stored on the one or more memory modules 142. Alternatively, the computer-executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more processors 141 can be coupled to a communication path 150 that provides signal interconnectivity between various modules of the system 10. Accordingly, the communication path 150 can communicatively couple any number of processors with one another, and allow the modules of the system 10 coupled to the communication path 150 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, over-the-air electromagnetic signals, optical signals via optical waveguides, and the like.

Accordingly, the communication path 150 can be formed from any medium that is capable of transmitting a signal such as, for example, conductive wires, conductive traces, optical waveguides, or the like. Moreover, the communication path 150 can be formed from a combination of mediums capable of transmitting signals. In one embodiment, the communication path 150 can comprise a combination of conductive traces, conductive wires, connectors, and buses that cooperate to permit the transmission of electrical data signals to components such as processors, memories, sensors, input devices, output devices, and communication devices. Accordingly, the communication path 150 can comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Upon operation, air flowing through the air intake 101, turbocharger 102 and intake manifold 08 is supplied to the individual cylinders 110, as is fuel through the fuel injectors 112. Upon combustion of the fuel and air in the cylinders 110, exhaust gas exits the cylinders 110 and enters into exhaust system 120 at inlet 122, flows through the exhaust pipe 121 and exits at outlet 124. At least a portion of the exhaust gas can be recirculated through the diesel ICE 100 via the EGR 118. It should be appreciated that recirculation of exhaust gas through the diesel ICE 100 can reduce the amount of NO in exhaust gas that exits the exhaust manifold 116 and flows through the exhaust pipe 121. Exhaust gas that exits the exhaust manifold 116, enters the exhaust pipe 121 through inlet 122, flows past the first NOx sensor 130, through the DOC/DPF 126, through the SCR catalyst 128 and exits the exhaust pipe 121 via outlet 124. The first NOx sensor 130 provides a signal related to a quantity of NOx in the exhaust gas having exited the exhaust manifold 116 prior to reaching the DOC/DPF 126 and prior to any intentional oxidation of NO to $NO_2$. After flowing past the first NOx sensor 130, the exhaust gas flows though the DOC/DPF 126 where oxidation of NO to $NO_2$ occurs and the amount of NO in the exhaust decreases. After flowing through the DOC/DPF 126, the exhaust gas flows through the SCR catalyst 128. The reducing agent dosing system 127 provides a reducing agent to the SCR catalyst, which in turn reduces NO and $NO_2$ to $N_2$ and $H_2O$, and $CO_2$ if urea is included in the reducing agent. For example, reactions included in the stoichiometric reduction of NO and $NO_2$ using either anhydrous ammonia or hydrous ammonia are:

$$4NO+4NH_3+O_2 \rightarrow 4N_2+6H_2O \quad (1)$$

$$2NO_2+4NH_3+O_2 \rightarrow 3N_2+6H_2O \quad (2)$$

$$NO+NO_2+2NH_3 \rightarrow 2N_2+3H_2O \quad (3)$$

The stoichiometric reduction of NO and $NO_2$ using urea as the reducing agent occurs via the reaction:

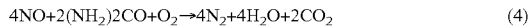

$$4NO+2(NH_2)2CO+O_2 \rightarrow 4N_2+4H_2O+2CO_2 \quad (4)$$

After passing through the SCR catalyst 128, the exhaust gas flows past the second NOx sensor 132 and exits the exhaust system 120 via outlet 124. The second NOx sensor 132 provides a signal related to a quantity of NOx in the exhaust gas having exited the SCR catalyst 128 and after conversion of NO to $NO_2$ and $N_2$ plus $H_2O$, and possibly $CO_2$, by the DOC/DPF 126 and SCR catalyst 128 with reducing agent dosing system 127. As such, the quantity of NO in the exhaust gas flowing past the second NOx sensor 132 is less than the quantity of NO in the exhaust gas flowing past the first NOx sensor 130, unless the DOC/DPF 126 and SCR catalyst 128 are completely not functioning. In addition, it should be appreciated that the quantity of NO in the exhaust gas flowing by the second NOx sensor 132 is a function of the efficiency of the DOC/DPF 126 in oxidizing NO to $NO_2$, i.e. as the DOC/DPF 126 ages and becomes less efficient, more and more NO that is present in the exhaust gas flowing past the first NOx sensor 130 will not be oxidized to $NO_2$ and thus will exit the DOC/DPF 126. It should also be appreciated from reactions (1)-(4) that the total quantity of NOx, i.e. NO plus $NO_2$ plus $N_2$ is generally equivalent between the first NOx sensor 130 and the second NOx sensor 132. It is appreciated that reaction (2) produces an additional product mole of $N_2$ compared to the reactant moles of $NO_2$, however the remaining reactions (1), (3) and (4) have the same molar quantities of reactant NOx species and product NOx species. As such, and due to current sensitivities of conventional NOx sensors it can be assumed that total quantity of NOx in the exhaust gas flowing past the first NOx sensor 130 is the same as the total quantity of NOx flowing past the second NOx sensor 132.

Figure 2:
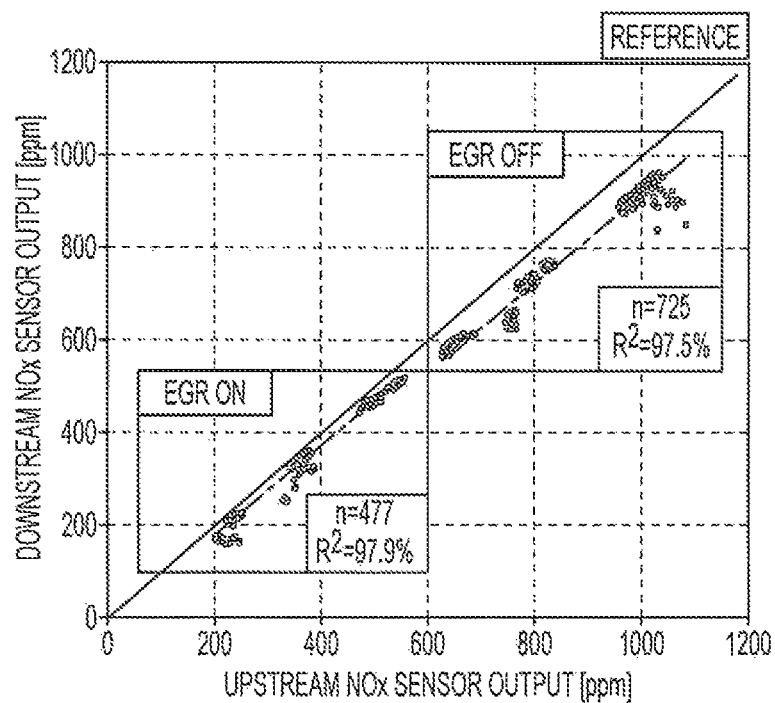
FIG. 2 schematically depicts a graph of downstream NOx sensor readings versus upstream NOx sensor readings when an EGR is on and when an EGR is off.

As noted above, and as illustrated in FIG. 2, the NOx sensors have different sensitivities or responsiveness between $NO_2$ than NO. For example, the Y axis in FIG. 2 illustrates NOx sensor readings from the second (downstream) NOx sensor 132 and the X axis represents NOx sensor readings from the first (upstream) NOx sensor 30. However, due to oxidation of NO to $NO_2$ provided by the DOC/DPF 126, the concentration of $NO_2$ is greater in the exhaust gas that reaches the second NOx sensor 132. As such, and in contrast to the second NOx sensor 132 reading the same amount of NOx as the first NOx sensor 130, the second NOx sensor 132 reads less NOx in the exhaust gas than the first NOx sensor 130. FIG. 2 also depicts the difference between the first NOx sensor 130 readings and the second NOx sensor 132 readings when the EGR 118 is operating and when the EGR 118 has been shut off (no exhaust gas recirculation). The greater difference between the first NOx sensor 130 readings and the second NOx sensor 132 readings when the EGR 118 has been shut off is due to a greater quantity of NO in the exhaust gas entering the exhaust system 120 compared to when the EGR 118 is operating, and thus conversion of a greater quantity of NO to $NO_2$ in the DOC/DPF 126. Stated differently, when the EGR 118 is shut off, there is a greater difference in the quantity of NO flowing past the first NOx sensor 130 and NO flowing past the second NOx sensor 132, than when the EGR 118 is operating. It should be appreciated that with the EGR shut off, more NO is present at the upstream NOx sensor and thus a greater percentage of the NO is oxidized to $NO_2$ by the DOC and thus the greater discrepancy shown by the downstream NOx sensor. Therefore, shutting off the EGR provides a greater difference between the readings of the two NOx sensors than compared when the EGR is on.

Figure 3:
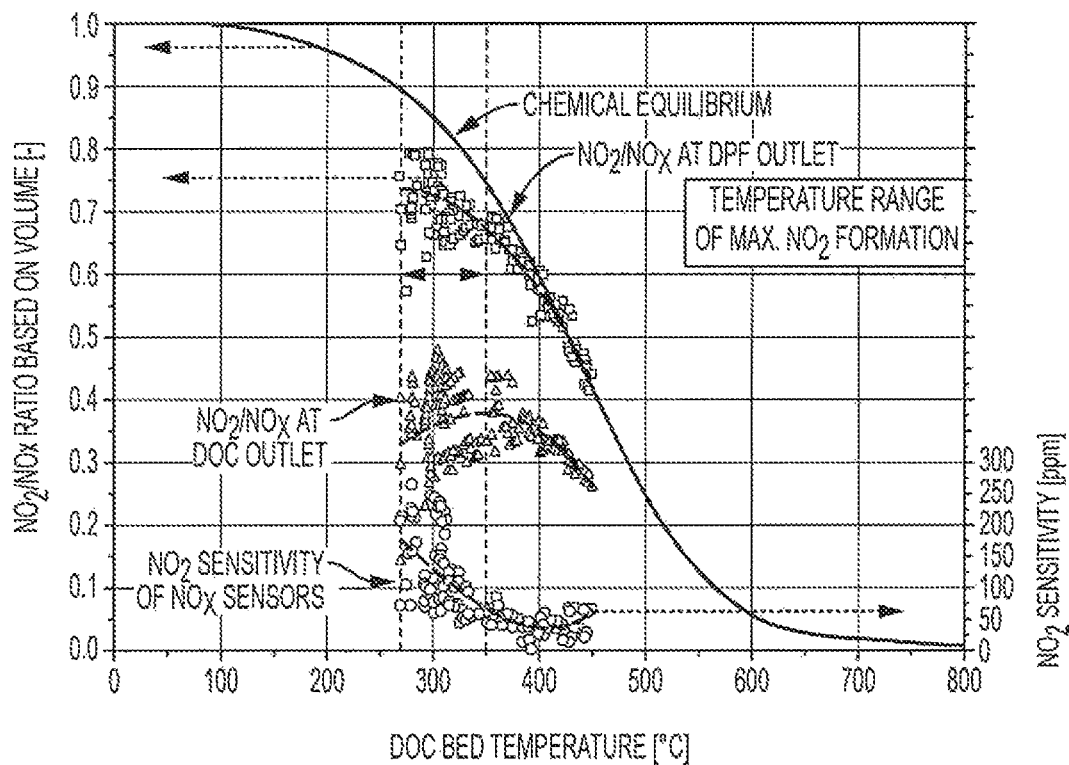
FIG. 3 schematically depicts the ratio of $NO_2$/NOx versus DOC bed temperature.

It is desired to determine which conditions of the exhaust system 120 provide the greatest difference of responsiveness between $NO_2$ than NO. As such, the temperature of the DOC is one factor to be considered and referring to FIG. 3, a graphical depiction of the ratio of $NO_2$ content versus total NOx content (NO2/NOx) based on volume and as a function of DOC temperature for: (1) output from a DOC; (2) output from a DPF; (3) and NO2 sensitivity is depicted. The NO2/NOx ratio was measured for a diesel ICE with a de-greened DOC/DPF with 50 hours of operation, after a regeneration event and using a Fourier Transform Infrared (FTIR) spectrometer. As illustrated in FIG. 3, a temperature range for the DOC/DPF between about 270-350° C. provides the best results.

At predetermined schedule times, the ECU 140 with the one or more processors 141 and computer-executable instructions cause a monitoring cycle to be executed. The monitoring cycles includes execution of a DPF regeneration event, shutting off the EGR 118, termination of reducing agent dosing to the SCR catalyst 128 and intrusive temperature control of the DOC/DPF. The monitoring cycle is executed for a sufficient time to allow storage of the reducing agent in the SCR catalyst 128 to be depleted and operating conditions for the diesel ICE 100 are established to intrusively maintain and control the temperature of the DOC/DPF 126 to within desired temperature range. For example, the intrusive control of the DOC/DPF temperature can be accomplished by operating the diesel ICE 100 within a predetermined range of engine speed, i.e. revolutions per minute (RPM). The monitoring cycle also includes obtaining readings from the first NOx sensor 130 and the second NOx sensor 132. The ECU 140 can determine a ratio between the first NOx sensor data and the second NOx sensor data (NOx1/NOx2), a difference between the first NOx sensor data and the second NOx sensor data (NOx1−NOx2), and the like.

Figure 4:
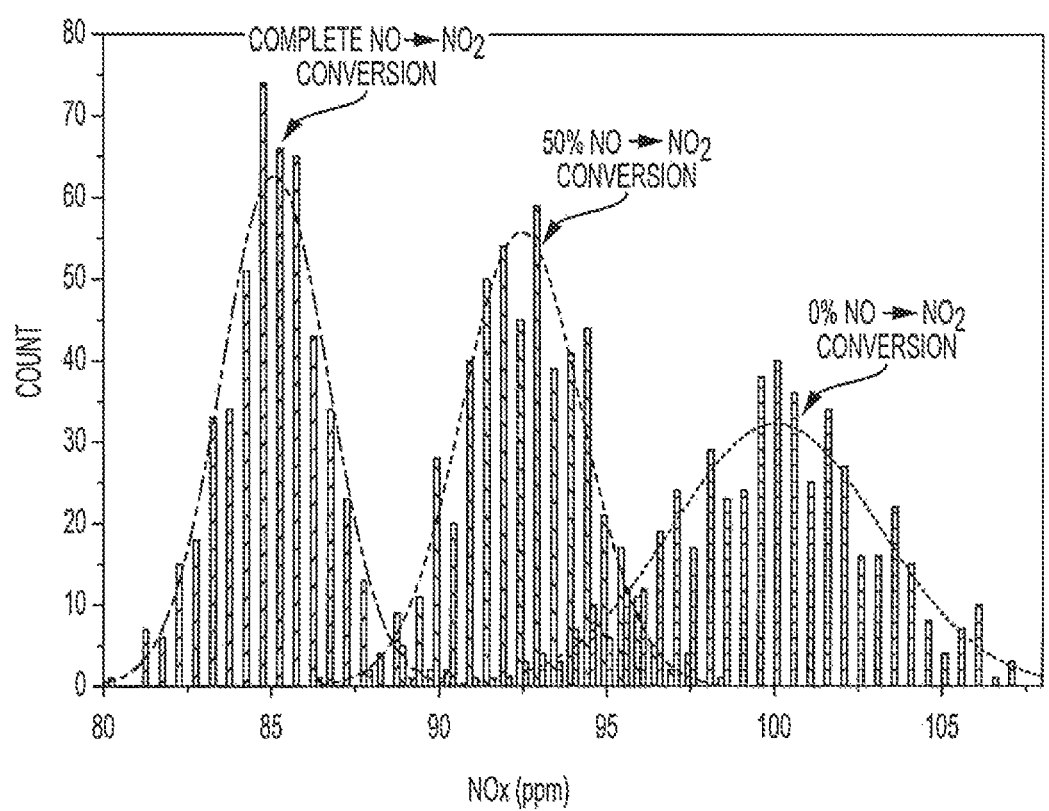
FIG. 4 schematically depicts NOx readings for a nominal 100 ppm NO emission from a diesel ICE.

Referring to FIG. 4, a graphical plot of NOx concentration measured by counts with an FTIR spectrum for three different DOC/DPF conditions and an initial NO content of 100 ppm is depicted. The data for a theoretical 100% conversion of NO to $NO_2$ illustrates a NOx concentration of about 85 ppm. The data for a 50% conversion of NO to $NO_2$ illustrates a NOx concentration of about 92 ppm. The data for a 0% conversion of NO to $NO_2$ illustrates a NOx concentration of about 100 ppm. As such, FIG. 3 illustrates that a decreasing efficiency in conversion of NO to NO2 by a DOC can be determined with a comparison of the measured NOx quantity in exhaust gas before a DOC and the measured NOx quantity in the exhaust gas after the DOC. As the DOC efficiency for conversion of NO to $NO_2$ decreases, the difference between an upstream, NOx sensor and a downstream NOx sensor will decrease and the ratio NOx1/NOx2 will approach unity (1.0).

Figure 5:
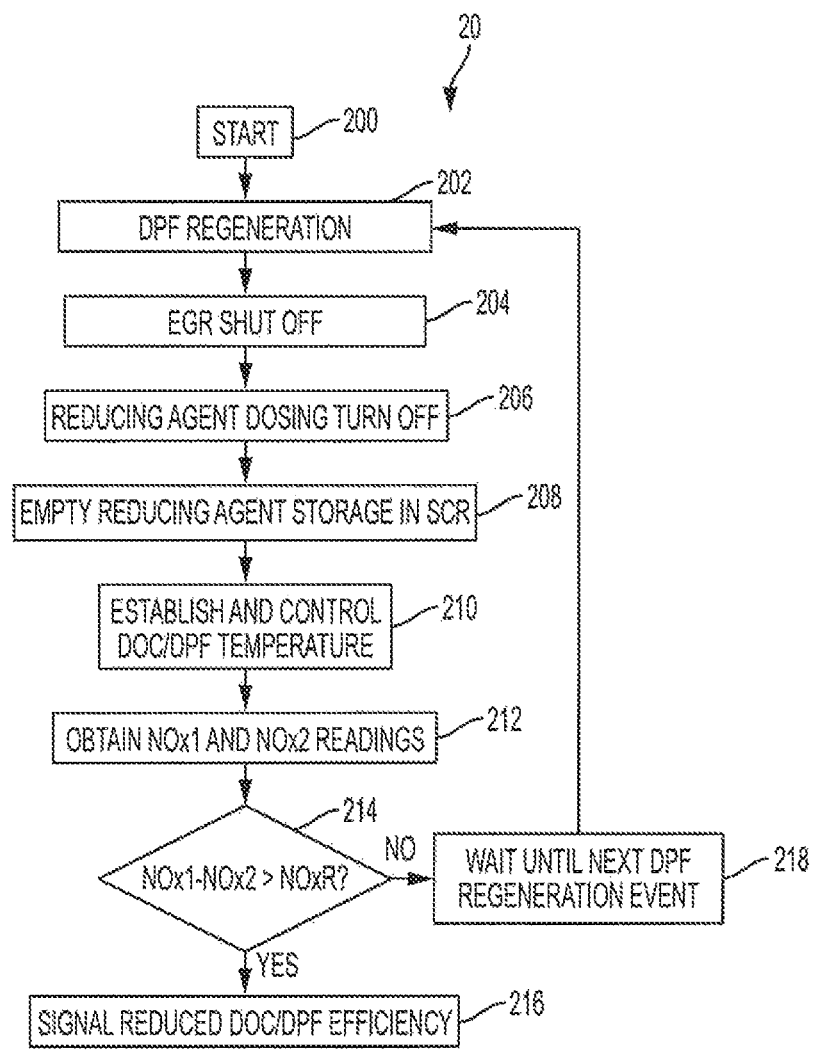
FIG. 5 schematically depicts a process flowchart according to one or more aspects described and illustrated herein.

With reference now to FIG. 5, a flowchart for a process 20 according to one or more aspects described and disclosed herein is depicted. The process 20 begins at step 200 with operation of the diesel ICE 100. At a predetermined time, e.g. a normally scheduled DPF regeneration time, the ECU 140 with the one or more processors 141 and computer-executable instructions cause a monitoring cycle to be executed. The monitoring cycle includes a DPF regeneration event of the DPF in the DOC/DPF 126 at step 202. In addition, the EGR 118 is shut off, i.e. exhaust gas from the exhaust manifold 116 is prevented from being recirculated to the intake manifold 108 at step 204. Reducing agent injection from the reducing agent dosing system 127 is terminated at step 206. At step 208, sufficient time is allowed to expire such that storage of the reducing agent in the SCR catalyst 128 is depleted. Intrusive control of the DOC/DPF 126 temperature occurs at step 210 and readings are obtained from the first NOx sensor 130 and the second NOx sensor 132 at step 212. At step 214, the ECU determines whether or not the difference between the first NOx sensor 130 readings and the second NOx sensor 132 readings is less than a predetermined NOx reference value. It should be appreciate that the ECU 140 can also determine if a ratio of the first NOx sensor 130 readings and the second NOx sensor 132 readings (NOx1/NOx2) is less than a predetermined NOx ratio reference value. In the event that the difference between the first NOx sensor and the second NOx sensor is less than the predetermined NOx reference value, or the NOx1/NOx2 ratio is less than the predetermined NOx ratio reference value, the process proceeds to step 216 in which the ECU provides an alert signal. It should be appreciated that the alert signal can be sent such that a warning light is illuminated, is stored in the one or more memory modules 142 for later retrieval, sent wirelessly to a vehicle dealership and the like. In the alternative, in the event that the difference between the first NOx sensor and the second NOx sensor is not less than the predetermined NOx reference value, or the NOx1/NOx2 ratio is not less than the predetermined NOx ratio reference value, the process 20 proceeds to step 218 in which the monitoring cycle is executed at the next predetermined time, e.g. the next scheduled regeneration event for the DPF in the DOC/DPF 126.

It should be appreciated that the methods and apparatuses described and disclosed herein can use exhaust system components already in place and currently in use. As such, no new exhaust system equipment is required in order for OBD monitoring and detection of DOC failure.

The above-described OBD monitoring and detection systems and methods provide determination of DOC failure. As such, the OBD monitoring and detection systems and methods described and disclosed herein can be implemented on vehicles currently in use and future vehicles to be manufactured and sold.

While particular aspects, examples, etc., have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A method for monitoring an oxidation catalyst in a vehicle exhaust system comprising:
   providing a diesel internal combustion engine (ICE) with an exhaust system, the exhaust system having an exhaust gas recirculation (EGR), a diesel oxidation catalyst/a diesel particulate filter (DOC/DPF) downstream from the EGR, a selective catalytic reduction (SCR) catalyst downstream of the DOC/DPF, a reducing agent dosing system operable to inject a reducing agent into the exhaust system upstream of the SCR catalyst, a first NOx sensor located upstream of the DOC/DPF and a second NOX sensor located downstream of the SCR catalyst;
   operating the diesel ICE with exhaust gas from the diesel ICE flowing through the exhaust system;
   executing a monitoring cycle, the monitoring cycle including:
      executing a DPF regeneration event at a predetermined scheduled time, shutting off the EGR, terminating reducing agent dosing to the SCR catalyst, and intrusively maintaining the temperature of the DOC/DPF within a predetermined temperature range;
      taking first NOx sensor readings and second NOx sensor readings during the monitoring cycle;
      determining at least one of a difference and a ratio between the first NOx sensor readings and the second NOx sensor readings;
   sending an alert signal that an efficiency of the DOC/DPF is decreasing if the at least one of the difference and the ratio between the first NOx sensor readings and the second NOx sensor readings is less than a predetermined reference value.

2. The method of claim 1, wherein the predetermined temperature range is between 270-350° C.

3. The method of claim 1, further comprising providing an electronic control unit (ECU) with one or more processors and a non-transitory computer-readable medium storing computer-executable instructions, wherein the computer-executable instructions, when executed by the one or more processors, execute the monitoring cycle.

4. The method of claim 1, further comprising the monitoring cycle including allowing sufficient time to pass after terminating reducing agent dosing to the SCR catalyst such that the reducing agent is depleted from the SCR catalyst.

5. The method of claim 1, wherein the predetermined reference value corresponds to a 50% conversion of NO to $NO_2$ by the DOC in the DOC/DPF.

6. The method of claim 1, wherein the ratio between the first NOx sensor readings and the second NOx sensor readings is determined and the predetermined reference value is 0.925.

7. The method of claim 1, further comprising operating the diesel ICE within a predetermined range of engine speed to intrusively maintain the temperature of the DOC/DPF within the predetermined temperature range.

8. A system for measuring efficiency of an oxidation catalyst in an exhaust gas system comprising:
- a diesel internal combustion engine (ICE) with an exhaust system, the exhaust system having an exhaust gas recirculation (EGR), a diesel oxidation catalyst (DOC) downstream from the EGR, a diesel particulate filter (DPF) downstream from the DOC, a selective catalytic reduction (SCR) catalyst downstream from the DPF, a first NOx sensor upstream the DOC and a second NOX sensor downstream the SCR catalyst;
- one or more processors;
- a non-transitory computer-readable medium storing computer-executable instructions that, when executed by the one or more processors, cause the diesel ICE and exhaust system to:
- execute a monitoring cycle, the monitoring cycle having:
  - a DPF regeneration event, EGR shut off, a termination of reducing agent dosing, and an intrusive control of the temperature of the DOC/DPF within a predetermined temperature range;
  - collection of first NOX sensor readings and second NOx sensor readings;
  - a determination of at least one of a difference and a ratio between the first NOx sensor readings and the second NOx sensor readings;
  - a determination if the at least one difference and ratio between the first NOx sensor readings and the second NOx sensor readings is less than a predetermined reference value; and
  - an alert signal if the at least one difference and ratio between the first NOx sensor readings and the second NOx sensor readings is less than the predetermined reference value.

9. The system of claim 8, wherein the predetermined temperature range is between 270-350° C.

10. The system of claim 8, further comprising the monitoring cycle having a predetermined time period after the termination of the reducing agent dosing to the SCR catalyst such that the reducing agent is depleted from the SCR catalyst.

11. The system of claim 8, wherein the predetermined reference value corresponds to a 50% conversion of NO to $NO_2$ by the DOC in the DOC/DPF.

12. The system of claim 8, wherein the ratio between the first NOx sensor readings and the second NOx sensor readings is determined and the predetermined reference value is 0.925.

13. The system of claim 8, wherein the computer-executable instructions that, when executed by the one or more processors, cause the diesel ICE to operate within a predetermined range of engine speed to intrusively control the temperature of the DOC/DPF within the predetermined temperature range.

14. The system of claim 13, wherein the predetermined temperature range is between 270-350° C.

* * * * *